Feb. 3, 1953 J. W. HENDRY 2,627,087
STROKE CONTROL FOR RAM-TYPE MOLDING MACHINES
Filed March 10, 1950
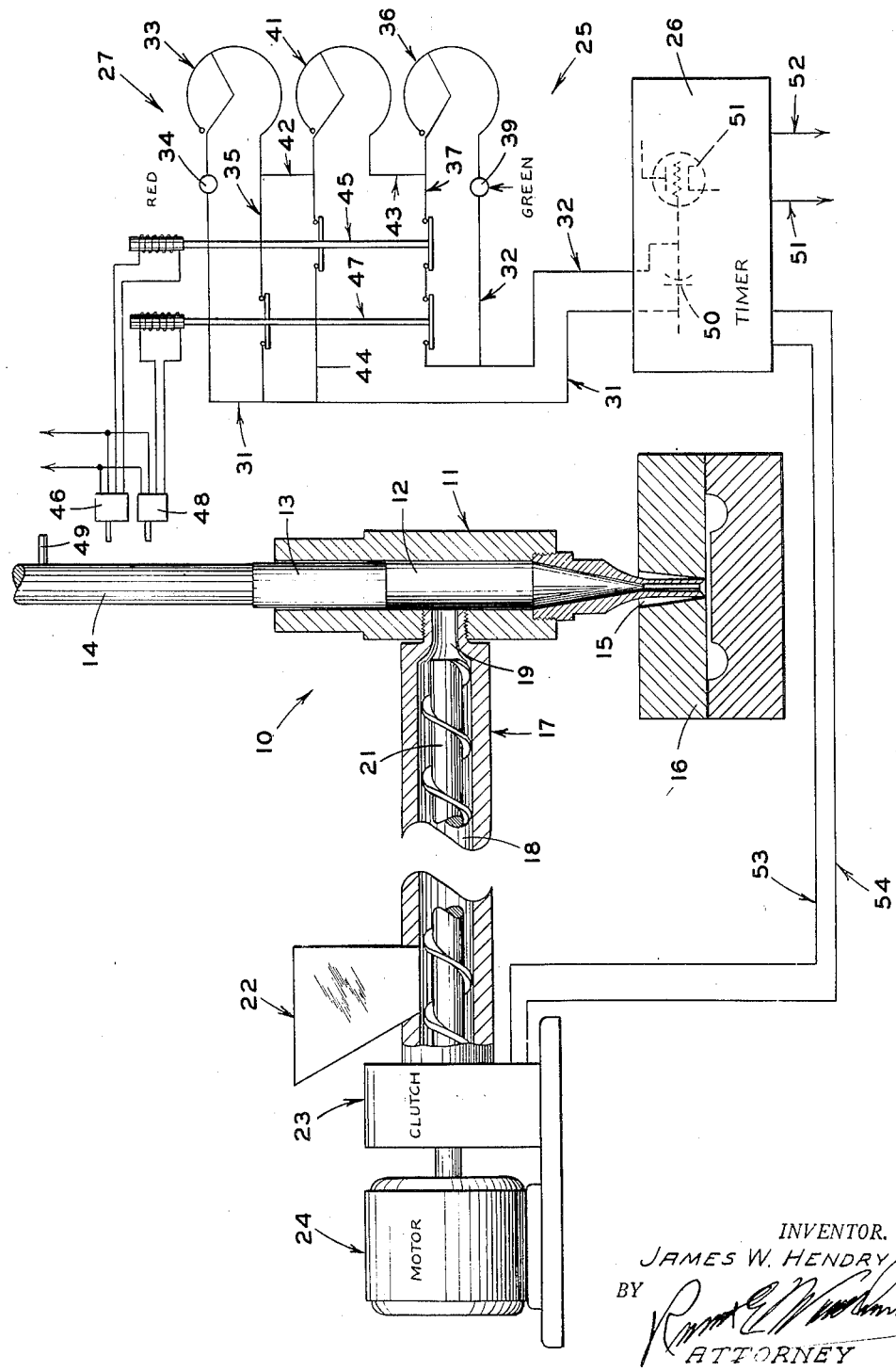
INVENTOR.
JAMES W. HENDRY
BY
ATTORNEY Patented Feb. 3, 1953

2,627,087

UNITED STATES PATENT OFFICE 2,627,087

STROKE CONTROL FOR RAM-TYPE MOLDING MACHINES

James W. Hendry, Bay City, Mich.

Application March 10, 1950, Serial No. 148,833

6 Claims. (Cl. 18—30)

This invention relates in general to an electronic control device and more specifically to a type thereof provided with means actuable by the ram of a ram-type molding machine, such as disclosed in my copending application Serial Number 93,935, for automatically controlling the period of advancement of plasticized material into the ram cylinder of the molding machine.

In order to operate satisfactorily an automatic ram-type plastic molding machine, the feed mechanism of the molding machine must supply the plastic into the ram chamber periodically in substantially uniform quantities. If the feed of the plastic is greater than the amount of plastic ejected from the molding machine with each stroke of its ram, that is, the capacity of the mold, the ram chamber will soon become too full of plastic to permit operation of the ram. On the other hand, if the amount of plastic being fed into the ram cylinder becomes less than the amount ejected from the molding machine with each stroke of the ram, the ram chamber will presently be emptied and the ram may be damaged and the mold will be starved.

Persons familiar with the operation of ram-type molding machines are acquainted with the fact that it is practically impossible to adjust the machine with sufficient accuracy to inject constant quantities of plastics material periodically into the ram cylinder of a ram-type molding machine, partly because of the variations in the material itself and partly because of the inevitable mechanical variations in the machine.

Accordingly, a primary object of my invention is the provision of an electronic control device for automatically controlling the period of time during which plastic is advanced into the ram chamber of a ram-type plastic molding machine to compensate for such variations and to keep the ram chamber filled to a desirable level.

A further object of this invention is the provision of an electronic control device, as aforesaid, having means actuable by the ram of the ram-type plastic molding machine for automatically and adjustably controlling the period during which plastic is fed into the ram chamber of said molding machine.

A further object of this invention is the provision of a control device, as aforesaid, having means actuable by the ram of a ram-type molding machine having a screw type feed mechanism driven by an electric motor through a clutch, whereby the time during which the clutch effects an engagement between the motor and the screw feed mechanism is automatically and adjustably controlled in response to variations in the length of the stroke of the ram as permitted by the amount of plasticized material in the ram chamber at any given time.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided an electronic control device including means actuable in response to movement of the ram in a ram-type plastic molding machine. The control device is electrically connected to, and controls the period of operation of, means by which plasticized material is fed into the ram chamber for the molding machine.

For an illustration of a preferred embodiment of my invention, reference is made to the accompanying drawing in which the single figure shows a partial, central cross-sectional view of a ram-type plastic molding machine, such as disclosed in the copending application Serial Number 93,935, and a partially schematic, partially diagrammatic, illustration of a control device connected thereto.

Construction

The particular ram-type molding machine, hereinafter described in detail, is so described for illustrative purposes only, and therefore, is not intended to limit the application of my control device. It will be evident to persons familiar with this type of equipment that my control device may be used with a variety of ram type molding machines within the scope of this invention.

For the purposes of convenience in description the terms "inwardly" and "outwardly," as used in the following specification, shall be understood to have reference to the geometric center of the plastic molding machine, or parts thereof. The terms "upper" or "upwardly" and "lower" or "downwardly" shall be understood to refer to the plastic molding machine as positioned and operated in its normal manner of use.

As shown in the figure, the plastic molding machine 10 is comprised of a cylindrical, axially vertical, ram cylinder 11 having a cylindrical ram chamber 12 therewithin. A ram 13 is snugly and slidably disposed within the ram chamber 12 and extends upwardly through the top of the ram cylinder 11. The lower end of the ram cylinder 11 may be tapered inwardly for insertion into the opening 15 in a mold 16, in a conventional manner. A cylindrical, horizontal processing device 17, having a cylindrical processing chamber 18 therewithin, is secured to the side of the ram cylinder 11 so that one end of said processing chamber communicates with the ram chamber 12 through the feed mouth 19. A feed screw 21 is rotatably supported within the processing chamber 18 and extends substantially the full length thereof. A feed hopper 22 is mounted upon the processing device 17 and communicates with the processing chamber 18 in a conventional manner.

The feed screw 21 is controllably engageable with and actuable by the electric motor 24 through a clutch 23. The period during which the clutch 23 effects an engagement between the motor 24 and feed screw 21 is electrically controlled by the electronic control device 25.

The electronic control 25 is comprised of an electronic timer 26, which includes one or more time delay circuits having a resistance and capacitance in parallel in the grid circuit of a thyratron, in general as disclosed and described in Patent Number 1,867,225 (Figure 1), or at page 77 of Chute, "Electronic Control of Resistance Welding," McGraw-Hill Book Company, Inc., 1943, with the exception that the resistor in parallel with the capacitor in said grid circuit, so shown, is replaced by the adjustable resistance circuit 27 shown in the figure of the accompanying drawing. Accordingly, a detailed description of the electronic timer 26, as such, will be omitted from this specification excepting for certain details specifically stated below where necessary to a complete understanding of the device.

In one preferred embodiment, the timer circuit is so arranged that a capacitor 50 in the timer 26 is charged during the down position of the ram 12 to a potential dependent upon the resistance in the circuit 25 connecting each side of said capacitor. This circuit is arranged to introduce more or less resistance thereinto during such charging period by which the amount of charge is controlled. When the capacitor is so charged, the grid of the tube 51 is subjected to a potential bias and conduction through the tube is blocked. In this preferred embodiment, the clutch 23 engages at a constant time interval after the upward movement of the ram and disengages when the tube 51 conducts at a preselectable period of time thereafter.

When the ram returns to its upward position, the resistance in said circuit is returned to a constant value and, subject to the control of the remainder of the timer and in a conventional manner, the capacitor discharges through a constant resistance until it reaches a potential level sufficiently low to permit the tube 51 to conduct. The time required for discharge is thus controlled by the extent of charge imposed onto the capacitor and this in turn is controlled by the amount of resistance in the circuit 25 during the period that the capacitor is charging. Thus, the length of time that is required for the capacitor to discharge to a non-biasing potential will control the length of time that the screw 21 is caused to rotate.

The specific circuit 25 which is associated with said capacitor will now be described in detail.

In the circuit 27 a conductor 31 connects the timer 26 to one side of a first adjustable resistor 33 through the red signal light 34. The other side of the adjustable resistor 33 is connected by the conductor 35 back to the conductor 31 at a point between the signal light 34 and the timer 26. A conductor 32 connects the timer 26 through the green signal light 39 to one side of a third adjustable resistor 36, so designated for convenience of reference in the claims. The other side of the resistor 36 is connected by the conductor 37 back to the line 32 at a point between the signal light 39 and the timer 26. A second adjustable resistor 41 is connected between the conductors 35 and 37 by the conductors 42 and 43, thus connecting the three resistors in series. A conductor 44 connects the conductor 42 to the conductor 31 at a point thereon between the conductor 35 and the timer 26.

A double pole high limit switch 45, responsive to mechanically actuable means, such as the micro-switch 46, is placed in each of the conductors 44 and 37. A double pole, low limit switch 47, which may be actuable by a micro-switch 48, is placed in the conductors 35 and 37. A micro-switch actuator 49 is secured to, and extends radially outwardly from, the ram rod 14 which extends axially upwardly from, and is secured to, the ram 13. The micro-switches 46 and 48 are preferably disposed adjacent to said ram rod 14 for engagement by said actuator 49.

The timer 26 is electrically energized through the supply conductor lines 51 and 52 from any suitable source and is electrically connected to the clutch 23 by means of the control conductors 53 and 54 in a conventional manner.

The switches 45 and 47 are normally closed and the switch actuator 49 is disposed upon the rod 14 so that only the micro-switch 46 will be contacted by the actuator 49, thereby opening the high limit switch 45, during normal operation of the molding machine. Accordingly, the operation of the electronic control device 25 will be considered first under normal conditions.

*Operation*

As the ram 13 moves downwardly to force plastic into the mold 16, the electronic control device 25 causes the clutch 23 to effect a disengagement between the motor 24 and the feed screw 21, at a predeterminable time before the ram 13 closes the mouth 19 of the feed chamber 18, thereby shutting off the urging of plastic material into the ram chamber. As the ram nears the bottom of its stroke, it actuates the micro-switch 46 which in turn effects an opening of the limit switch 45 thereby opening the conductors 44 and 37. Accordingly, current in the thyratron grid circuit passes through the line 31, the line 35, the line 42, the resistor 41, the line 43, the resistor 36, the line 32 and the green signal light 39, and thence back to the timer 26. The resistors 41 and 36 will constitute the normal resistance provided for said grid circuit. Also the current passes through the green signal light 39 when the molding machine is operating satisfactorily thereby indicating a proper stroke of the ram 13. When the ram 13 has again passed above the mouth 19, the control device 25 will cause the clutch 23 to effect engagement between the feed screw 21 and the motor 24.

As long as the stroke of the ram rod 14 remains satisfactory, the switch actuator 49 will contact the micro-switch 46, only, with each stroke of the ram 13 and the timing will be constant. However, if the period of operation of the screw 21 becomes too long and the ram chamber 12 has become overloaded with plastic material, thereby shortening the stroke of the ram 13, the switch actuator 49 will engage neither of the microswitches 46 and 48. Thus, both of the limit switches 45 and 47 will remain closed when the control device 25 transmits its next impulse through said grid circuit.

Thus, when the ram stroke is too short, current will pass from the timer 26 through the line 31, the line 44, the adjustable resistor 41, the line 43, the line 37, and the line 32 back to the timer 26, thus passing through the second resistor 41, only. This reduction of resistance in the resistance circuit of the timer grid circuit reduces the potential level to which the capacitor is charged and thereby shortens the time period in the conventional manner. This in turn causes the timer 26 to effect an earlier disengagement between motor 24 and the feed screw 21 than is normally effected by the timer when both the resistors 41 and 36 are in the said resistor portion of said grid circuit during the charging of said capacitor. Accordingly, the period of operation of the feed screw 21 will be reduced a corresponding, predeterminable amount. The resultant decrease in flow of plastic in each cycle of operation will continue until the switch actuator 49 again engages the micro-switch 46 and returns the resistor circuit 27 to its normal condition of operation.

If an insufficient amount of plastic is being fed into the ram chamber 12, the stroke of the ram 13 will continue to increase until the switch actuator 49 engages both micro-switches 46 and 48, thereby opening both the switches 45 and 47. Under these conditions, the current in the resistance circuit passes from the timer through the line 31, the red signal light 34, the resistor 33, line 42, the resistor 41, the line 43, the resistor 36, the line 32 and the green light 39, back to the timer 26.

With all three resistors 33, 41 and 36 in the resistance circuit, the potential level to which the capacitor is charged is increased and thereby the timing period is increased. This delays the disengagement between the motor 24 and the feed screw 21. Accordingly, the period of time of operation of the feed screw and the resultant advancement of plastic into the ram chamber 12 is increased through succeeding cycles of operation of the molding machine until such time that the switch actuator 49 no longer engages the micro-switch 48.

Accordingly, it will be seen that too short a stroke of the ram rod 14, thereby indicating too much plastic material in the ram chamber 12, will automatically decrease the amount of plastic material being fed into the ram chamber with each operation cycle of the machine. Too little plastic in the ram chamber, which increases the stroke of the ram 13, will increase the period during which plastic is fed into the chamber.

By the use of a potentiometer for the resistor 41, as shown, the time of normal actuation of the screw may be adjusted in a conventional manner; and by use of potentiometers for the resistors 33 and 36, the magnitude of the timing corrections may be readily adjusted.

It will be recognized that since the timer 26 embodies a time delay circuit, the relative time at which the clutch effects engagement between the motor 24 and the feed screw 21 may remain constant, and changes in the resistance of the resistance circuit 27 will effect corresponding changes in the time at which disengagement of the clutch is effected. However, it will be clearly understood that by the use of other conventional timer circuits, the disengagement time of the clutch may be held constant and the engagement time varied.

Although the above mentioned drawing and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In an automatic, electronic device for controlling the period of operation of means feeding plastic into a ram-type molding machine having a reciprocable ram, the combination comprising: an electronic timer of the time delay type including an electron discharge device having a cathode, an anode and a grid circuit having parallel resistance and capacitance circuits in said grid circuit and so connected that operation of said feeding means is responsive to the condition of said electron discharge device; a power supply energizing said timer; first, second and third adjustable, series connected, resistors in said resistance circuit; first and second lines shunting the firts resistor and a third line shunting the third resistor; one double pole, normally closed switch in each of said second and third lines and another, double pole, normally closed switch in each of said first and third lines; and actuating means responsive to movement of said ram for opening said switches successively as said ram moves in mold filling direction; whereby the amount of resistance in said resistance circuit, which controls the period of operation of said feeding means, is dependent upon the length of stroke of the ram.

2. A control circuit for a plastic working machine having a ram chamber and a ram reciprocable therein, and having a timing circuit including a resistance and a capacitance in parallel in the grid circuit of a grid controlled electric discharge device, the improvement in the resistance portion of said parallel circuit comprising: first, second and third resistors in series in said circuit; ram switches so placed with respect to the operation of said ram that a first switch will be operated when the ram stroke is of a predetermined length, both switches will be operated when said ram stroke exceeds said length by a predetermined amount and neither switch is operated when said ram stroke is less than said predetermined length; means associated separately with said first and third resistors respectively and including normally closed switches normally shunting out of said resistance circuit each of said first and third resistances; means responsive to actuation of said first ram switch opening those of the normally closed switches opening the shunt associated with said first resistor, and means responsive to actuation of said second ram switch opening those of the normally closed switches opening the shunt associated with said third resistor whereby actuation of the first ram switch effects series connection of said first and second resistor and actuation of said second ram switch effects series connection of said second and third resistor, whereby if the stroke is less than desired, neither switch will be actuated whereupon only the second resistor will be utilized in said grid circuit and the time of operation of the screw will be shortened and if the stroke is longer than desired both switches will be actuated and all three resistors will be utilized whereupon the time of operation of the screw will be lengthened.

3. A timing control circuit for a plastic working machine including a ram, said machine being fed by controllable means and said machine having an electronic timer including an electric discharge device so connected that the period of operation of said controllable means is responsive to conduction of said electric discharge device, the combination: a time-constant circuit including a capacitor in the grid circuit of said electric discharge device; means responsive to the length of stroke of said ram varying one time-controlling element of said time-constant circuit when said ram is in one selected position for a given stroke and restoring said time-controlling element to its original state when said ram is out of said selected position; said timer being so arranged and so connected to said machine that said capacitor is charged while said ram is in said selected position and said capacitor is discharged when said ram is out of said selected position, whereby the period of operation of said controllable means is responsive to the period required for discharge of said capacitor and said period is controllable by the length of stroke of said ram.

4. In an automatic, electronic device for controlling the period of operation of means feeding plastic into a ram-type molding machine having a reciprocable ram, the combination comprising: an electronic timer of the time delay type including an electron discharge device having a cathode, an anode and a grid, and said timer having parallel resistance and capacitance circuits in the circuit of said grid and so connected that operation of said feeding means is responsive to the condition of said electron discharge device; a power supply energizing said timer; first, second and third adjustable, series connected, resistors in said resistance circuit; first and second circuits shunting the first resistor and a third circuit shunting the third resistor; one double pole, normally closed switch in each of said second and third circuits and another, double pole, normally closed switch in each of said first and third circuits; whereby the amount of resistance in said resistance circuit, which controls the period of operation of said feeding means, is dependent upon the position of said switches.

5. The method of controlling the quantity of plastic material supplied to the chamber of a ram-type molding machine having a reciprocable ram and a timing mechanism therefore which includes a time-constant circuit having a capacitor and a resistor therein, the steps: utilizing the shortening of the strokes of said ram which occur when the feeding of said ram chamber is at a rate in excess of the discharge therefrom to diminish the resistance in said time-constant circuit, and utilizing the diminishing of said resistance to shorten the period of operation of the chamber feeding mechanism; utilizing the lengthening of the strokes of said ram which occur when the feeding of said chamber is less then the discharge therefrom to increase the resistance in said time-constant circuit and utilizing said increase in resistance to lengthen the period of operation of said feeding mechanism.

6. In an automatic electronic timer for controlling the period of operation of means for feeding plastic material into a ram-type molding machine having a reciprocable ram, and said timer including an electric discharge device having a cathode, an anode and a grid, and having a time-constant circuit including a resistance circuit connected to said grid, means for adjusting the time function of said time-constant circuit comprising: a power supply energizing said timer, first, second and third, series connected, adjustable resistors in said resistance circuit; first and second circuits shunting the first resistor and a third circuit shunting said third resistor; one double pole normally closed switch in each of said second and third circuits, and another double pole normally closed switch in each of said first and third circuits; means including a limit switch opening and closing said one double pole switch and means including a second limit switch opening and closing said other double pole switch.

JAMES W. HENDRY.

REFERENCES CITED

The following references are of record in the file of this patent:

UNITED STATES PATENTS

| Number | Name | Date |
| --- | --- | --- |
| 2,350,539 | Smith | June 6, 1944 |
| 2,408,285 | Ashbaugh | Sept. 24, 1946 |